US009823986B2

(12) United States Patent
Li et al.

(10) Patent No.: US 9,823,986 B2
(45) Date of Patent: Nov. 21, 2017

(54) MEMORY NODE ERROR CORRECTION

(71) Applicant: Hewlett-Packard Development Company, L.P., Houston, TX (US)

(72) Inventors: Sheng Li, Palo Alto, CA (US); Norman Paul Jouppi, Palo Alto, CA (US); Paolo Faraboschi, Palo Alto, CA (US); Doe Hyun Yoon, Palo Alto, CA (US); Dwight L. Barron, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 14/786,615

(22) PCT Filed: Apr. 30, 2013

(86) PCT No.: PCT/US2013/038936
§ 371 (c)(1),
(2) Date: Oct. 23, 2015

(87) PCT Pub. No.: WO2014/178855
PCT Pub. Date: Nov. 6, 2014

(65) Prior Publication Data
US 2016/0085653 A1    Mar. 24, 2016

(51) Int. Cl.
*G06F 11/00*    (2006.01)
*G06F 11/20*    (2006.01)
(Continued)

(52) U.S. Cl.
CPC .......... *G06F 11/2094* (2013.01); *G06F 11/08* (2013.01); *G06F 11/10* (2013.01);
(Continued)

(58) Field of Classification Search
CPC ...... G06F 11/1076; G06F 11/08; G06F 11/10; G06F 11/1016; G06F 11/0709; G06F 11/2094
See application file for complete search history.

(56) References Cited

U.S. PATENT DOCUMENTS 7,475,220 B1 *   1/2009   Hastings ............. G06F 12/1475
                                                                711/154
8,364,891 B2     1/2013   Margolus et al.
(Continued)

FOREIGN PATENT DOCUMENTS

CN       101110047 A      1/2008
CN       102812519 A      12/2012

OTHER PUBLICATIONS

Partial supplementary EP search report dated Nov. 9, 2016, 7 Pgs.
(Continued)

*Primary Examiner* — Charles Ehne
(74) *Attorney, Agent, or Firm* — Mannava & Kang, P.C.

(57)    ABSTRACT

According to an example, a resiliency group for a memory node in a memory network can provide error correction for a memory access in the memory node. The memory access may be received from a main memory controller of a processor connected to the memory network. The memory access may be executed by a memory controller of the memory node.

15 Claims, 6 Drawing Sheets

(51) Int. Cl.
G06F 11/08 (2006.01)
G06F 11/10 (2006.01)

(52) U.S. Cl.
CPC ...... G06F 11/1048 (2013.01); G06F 11/1076 (2013.01); *G06F 2201/805* (2013.01); *G06F 2201/85* (2013.01); *G06F 2211/1059* (2013.01)

(56) References Cited

U.S. PATENT DOCUMENTS

| | | |
|---|---|---|
| 2007/0226579 A1 | 9/2007 | Alexander et al. |
| 2008/0022186 A1 | 1/2008 | Co et al. |
| 2008/0101104 A1 | 5/2008 | Ikeda |
| 2008/0195719 A1* | 8/2008 | Wu .................. H04L 67/10 709/213 |
| 2009/0193315 A1 | 7/2009 | Gower et al. |
| 2010/0162037 A1 | 6/2010 | Maule et al. |
| 2010/0269021 A1 | 10/2010 | Gower et al. |
| 2011/0154104 A1 | 6/2011 | Swanson et al. |
| 2011/0231739 A1* | 9/2011 | Kim .................. G06F 11/1048 714/773 |
| 2013/0061084 A1 | 3/2013 | Barton et al. |
| 2013/0311823 A1* | 11/2013 | Kaplan ............... G06F 11/2023 714/15 |

OTHER PUBLICATIONS

Balaji, P. et al., Fault Tolerance Techniques for Scalable Computing, (Research Paper), Feb. 2012., 33 Pages.
Brunina, D. et al., Resilient Optically Connected Memory Systems Using Dynamic Bit-steering [invited], (Research Paper), Nov. 2012, pp. 151-160, vol. 4, No. 11.
International Searching Authority, The International Search Report and the Written Opinion, dated Jan. 27, 2014, 11 Pages.
Shalf, J. et al., Exascale Computing Technology Challenges, (Research Paper), Proceedings of the 9th international conference on High performance computing for computational science, 2011, pp. 1-25.

* cited by examiner

MEMORY NODE ERROR CORRECTION

CROSS-REFERENCE TO RELATED APPLICATIONS

The present application is related to PCT/US2013/038937 entitled "Memory Network" by Li et al., and to PCT/US2013/038935 entitled "Memory Network to Route Memory Traffic and I/O Traffic" by Barron et al., both of which are filed concurrently with the present application and are assigned to the same assignee as the present application.

BACKGROUND

Computer networks and systems have become indispensable tools for modern business. Today terabytes of information on virtually every subject imaginable are stored and accessed across networks. Some applications, such as telecommunication network applications, mobile advertising, social media applications, etc., demand short response times for their data. As a result, new memory-based implementations of programs, such as in-memory databases, are being employed in an effort to provide the desired faster response times. These memory-intensive programs primarily rely on large amounts of directly addressable physical memory (e.g., random access memory) for storing terabytes of data rather than traditional hard drives to reduce response times.

BRIEF DESCRIPTION OF DRAWINGS

The embodiments are described in detail in the following description with reference to examples shown in the following figures.

DETAILED DESCRIPTION OF EMBODIMENTS

Figure 1:
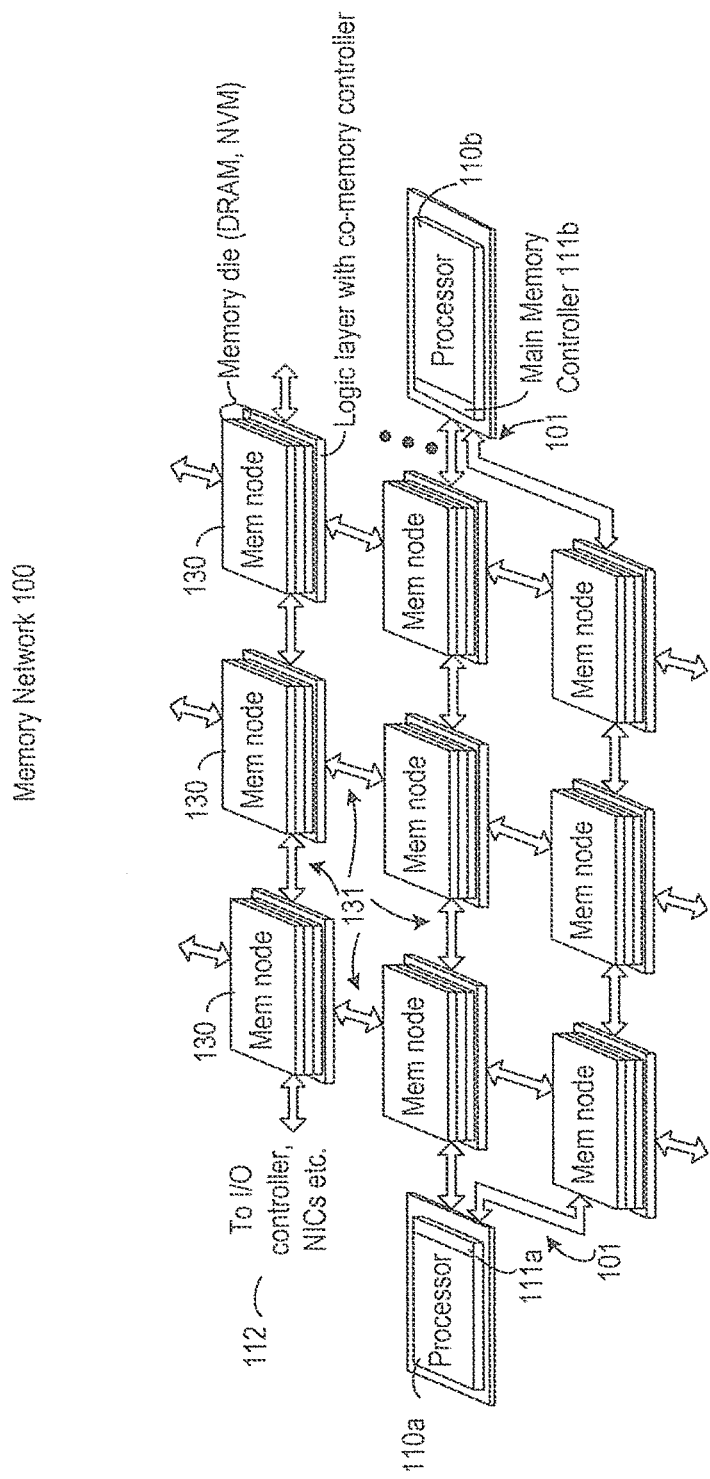
FIG. 1 illustrates a memory network.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A memory network, according to an example, includes memory nodes that are connected via high-speed interconnects, such as high-speed point-to-point links. Each memory node may be a memory subsystem including a memory controller and memory to store data. The memory node may also include routing logic to route data or memory access commands to a destination, which may be another memory node in the memory network. A packet-based protocol may be used for routing communications in the memory network, including communications between processors and memory nodes. Also, the memory network may be a shared memory for the processors connected to the memory network. For example, main memory controllers for the processors may be connected to memory nodes in the memory network to execute memory access commands on the memory nodes. The main memory controllers may read data from and write data to the memory nodes of the memory network. The memory network can act both as a scalable, high-performance memory pool and as a network for supporting data transmission between memory nodes in the memory network and between processors and the memory nodes.

The memory network facilitates memory capacity scalability and enables easy data sharing among systems connected to the memory network. To scale the memory network, additional memory nodes may be added to the memory network and connected to existing memory nodes for example via point-to-point links. The memory network, given its scalability can support large capacity and high bandwidth, big-data applications, such as in-memory databases. Also, the memory network can support heterogeneous memory technologies and dynamic link bandwidth by leveraging a decoupled memory interface. The decoupled memory interface may include a memory controller provided for each memory node.

The memory network also provides resiliency so no single point of failure may cause a system failure. For example, the memory network supports access groups and resiliency groups. Multiple memory nodes or one memory node may be accessed for a single memory operation (e.g., read or write). A memory node may include one or more memory chips, Any memory chips that are accessed for a memory access command are included in an access group. The memory chips may be DRAM chips which may be in stacked memory, a memristor chip or other types of memory chips. The access group may include a single memory node or multiple memory nodes storing data for the memory access.

A resiliency group may include memory chips in one or more memory nodes that are used for an error detection and correction operation. The memory chips involved in an error detection and correction operation is a resiliency group. The error detection and correction can also be hierarchical, where error detection can be separated from error correction. In a hierarchical design, error detection is implemented inside the access group, and error correction relies on the resiliency group. It is common that the access group and resiliency group overlap. For example, widely used SECDED (single error correction, double error detection) uses all DRAM chips on a DIMM for access and ECC but provides no flexibility for selecting the resiliency group.

The memory network, on the other hand, provides the flexibility to form different resiliency groups. Flexible formation of resiliency groups can provide trade-offs between protection levels and overhead of performance, energy efficiency, and storage, by changing the ratio of data units (data memory nodes) to the parity/checksum units (parity memory nodes). The resiliency group formation may vary, if different topologies are used. For example, neighbor memory nodes of a memory in the memory network are selected for a resiliency group for the memory node. The neighbor memory nodes may be nodes that are directly next to the memory node in the topology. For example, in a tree topology, a specific memory node with its parent and children nodes can form a resiliency group; in a mesh topology, a specific memory node with its neighbor nodes can form resiliency group. Also, the memory nodes in a resiliency group do not need to be adjacent as long as there are communication channels among the memory nodes, which are provided by the links in the memory network. SECDED does not provide flexible resiliency groups. For example, SECDED must use the same access group (all data and ECC chips) on the same DIMM to form a codeword with both data and ECC bits.

A resiliency group may include a single memory node or multiple memory nodes. The resiliency group for a memory node may be defined by a system administrator and an indication of the memory nodes in a resiliency group is stored in each memory node. As indicated above, factors such as protection levels and overhead, performance, energy efficiency, and storage may be considered when determining the resiliency group, including its size.

Memory protection can include local error detection at a single memory node and/or error correction performed by a resiliency group with one or more memory nodes. Since each memory node may include a co-located memory controller, the resiliency group formation, local error detection, and error correction can be offloaded to the co-located memory controllers rather than performed at the processors through their main memory controllers, CRC (cyclic redundancy check) and other checks may be performed by the memory controllers of the memory nodes to detect errors and improve the overall system performance.

The memory network also provides multiple other resiliency enhancements. For example, multiple alternative paths are available through the memory network from a source to a destination memory node. Thus, a single link or a memory node failure does not affect the availability of the memory system. Also, failure on a local memory channel at the processor to connect to the memory network should not affect other processors to access the memory network, which is unlike existing systems whereby a processor failure costs the loss of the memory connected through its private memory channel. Moreover, even if all processors fail, the memory network is still available via input/output (I/O) ports connected to memory nodes. Also, links connecting nodes in the memory network may include point-to-point links, each with multiple lanes. A lane may be a unidirectional channel in the link that has a portion of the bandwidth of the link. Routing logic at the memory node can perform lane failover by disabling failed lanes and run the link at reduced bandwidth. For example, in the memory network, the links deploy separate error protection with CRC. If a link or lane fails as determined by the CRC, the errors are reported to the main memory controller of the processor. After a certain preset threshold, the main memory controller stores the link failure and disables the specific failed link or lane. The adjacent alternative links or lanes are used for routing memory operations. With these alternative paths, no single point of failure can take down the memory system.

The memory nodes may use multi-dimensional stacked memory with a co-memory controller that can all be provided on a single package. For local error detection, the memory stack is divided into multiple vertical slices, with each vertical slice being a potential independent responder for each memory access to increase parallelism. Symbol-based Reed-Solomon code may be used for local error detection. In Reed-Solomon code, T check symbols can detect T symbol errors, for a max of $2^b-1$ symbols including both data and check symbols, where b is bit count per symbol and T may be an integer greater than 0. Each bank in a vertical slice can be used as an independent source of symbols (either a data symbol or a check symbol) in the Reed-Solomon code, and the ratio of data symbols to check symbols may be varied to balance resiliency and storage overhead. Also, multiple vertical slices can be grouped together to enable more flexibility of choosing data and check symbols.

FIG. 1 shows an example of a memory network 100. Processors 110a-b and main memory controllers 111a-b are connected to the memory network 100 for example using point-to-point links 101. A point-to-point link is a wire or other connection medium that links two circuits. In one example, a point-to-point link connects only two circuits which is unlike a shared bus or crossbar switches that connect more than two circuits or devices. A processor and main memory controller connected to the memory network 100, such as 110a and 111a or 110b and 111b, may be provided on the same chip, or may be provided on separate chips. Also, more or fewer processors, main memory controllers and memory nodes than shown in FIG. 1 may be used in the memory network 100. Also, any circuit 112 that may use memory, other than processors 110a-b, may be connected to the memory network 100. Each of the processors 110a-b runs an operating system (OS) that may execute page management mechanisms described below and perform other functions.

Inside the memory network 100, memory nodes 130 may also be connected together via point-to-point links 131, which are inter-node point-to-point links. Each memory node can operate as a destination of a memory access if the data to be accessed is stored at the memory node, and as a router that forwards a memory access command to its appropriate destination memory node if the data to be accessed is at a different memory node. For example, the main memory controllers 111a-b can send memory access commands, e.g., read, write, copy, etc., to the memory nodes 130 to perform memory accesses for the processors 110a-b. Each memory node receiving a command may execute the command if it is the destination or route the command to its destination memory node, as is further described below. The memory network 100 provides memory scalability through the point-to-point links 131 and through the ability to add memory nodes as needed, which satisfies the memory capacity requirements of big-data workloads. Scaling up memory capacity in the memory network 100 is as easy as cascading additional memory nodes. Moreover, since the memory capacity expansion in the memory network 100 is through memory channels, e.g., the point-to-point links 131, rather than dedicated I/O channels, it requires minimum modifications to the hardware and operating system.

Figure 2:
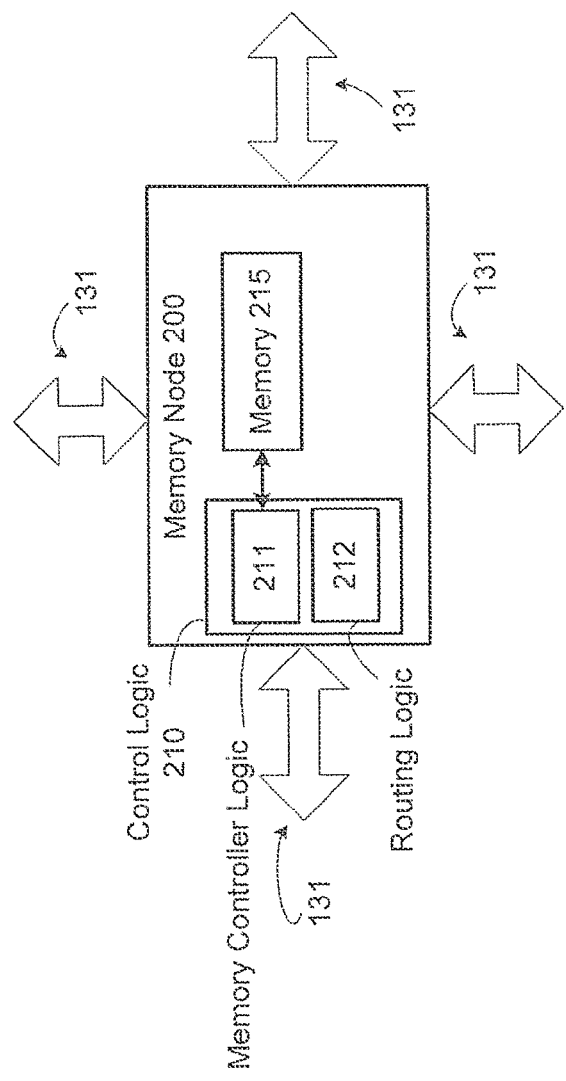
FIG. 2 illustrates a block diagram of a memory node.

FIG. 2 shows a block diagram of the memory node 200 which may represent any of the memory nodes 130 shown in FIG. 1. The memory node 200 includes control logic 210 and memory 215. The memory 215 may be dynamic random-access memory (DRAM) or any type of semiconductor memory that is volatile or nonvolatile. The control logic 210 may include memory controller logic 211 and routing logic 212. The control logic 210 may include hardware and/or machine readable instructions stored on a storage medium and executable by hardware. The memory controller logic 211 and routing logic 212 may be implemented by two separate hardware circuits or the same circuit. The memory controller logic 211 performs the operations of a memory controller for the memory 215 including memory access operations, and is also referred to as a co-located or co-memory controller. The routing logic 212 receives memory access commands, determines whether it is the destination, and sends the memory access commands to the memory controller logic 211 for execution if it is the destination. If the memory node is not the destination, the routing logic 212 sends the memory access commands to a next hop in the memory network toward the destination. Various routing protocols may be used for routing.

Figure 3:
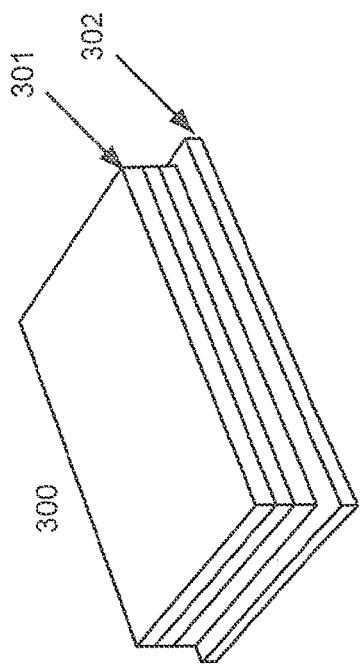
FIG. 3 illustrates a stacked memory node.

In one example, the memory node 200 may be a collection of multiple memory chips packaged in a single component, such as three-dimensional (3D) or 2.5D stacked dynamic random-access memory (DRAM). Any form of co-packaged memory, including multi-dimensional stacked memory, may be used in a memory node. FIG. 3 shows an example of 3D stacked DRAM. For example, the 3D stacked DRAM 300 may include multiple layers of dense memory 301 with a base logic layer 302 which may be on a separate die. Each layer of the memory 301 may be a separate die. Each layer is on its own plain in the stack. The 3D stacked DRAM 300 may include through silicon via (TSV) channels for transferring data from a DRAM in the memory die 301 to the base logic layer 302. The base logic layer 302 includes the control logic 210 shown in FIG. 1.

Figure 4:
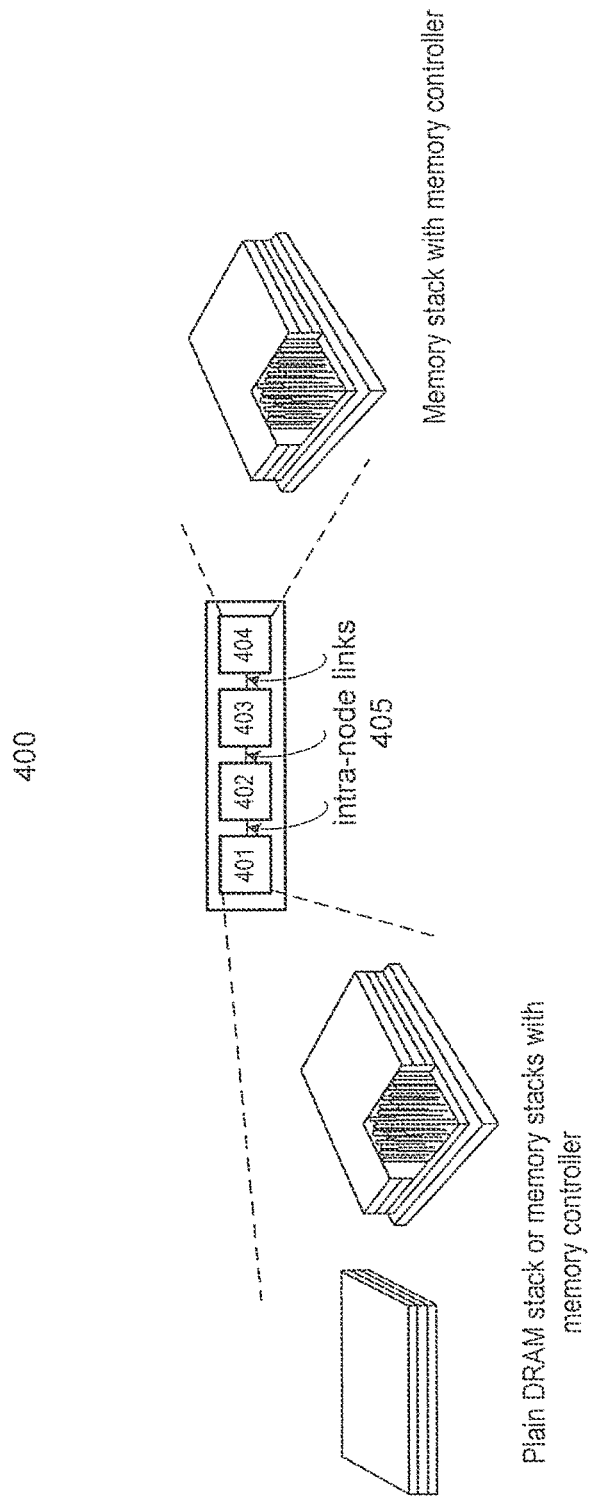
FIG. 4 illustrates a memory node with multiple stacked memories.

FIG. 3 shows a single-stack memory node example. In another example, the memory node 200 may include multiple memory stacks, and each memory stack is connected via intra-node links. For example, FIG. 4 shows a block diagram of a multi-stack memory node 400 that may be used as a memory node in the memory network 100. In this example, the memory node 400 includes memory stacks 401-404 but a memory node may have less than four or more than four memory stacks. At least one of the stacks has a co-memory controller. For example, stack 401 includes a base logic layer such as shown in FIG. 3. The base logic layer may include the control logic 210 that includes memory controller logic 211 and routing logic 212 of FIG. 2. The other stacks may or may not include control logic. For example, stack 404 is a plain DRAM stack without control logic and stack 403 has control logic. The stacks 401-404 are connected via intra-node links 405.

The memory network 100 is included in a hierarchy of memory subsystems. For example, an upper level of the hierarchy includes memory subsystems for the processors 110a-b, which may include the main memory controllers 111a-b and the memory nodes 130 operating as memory for main memory controllers 111a-b. A lower level of the hierarchy includes the memory subsystem in each memory node. FIGS. 2-4 show examples of memory subsystems for the memory nodes 130. Also, the topologies of the memory at all levels are flexible. Examples of topologies may include 2D mesh, torus, tree, etc. The memory network 100 is shown as a 2D mesh in FIG. 1 as an example.

A decoupled memory interface is used for the hierarchy of memory subsystems. A decoupled memory interface for example means that there is no single central memory controller for all the memory subsystems. Instead, the memory controllers are distributed, such as the main memory controllers 111a-b for the processors 110a-b and the memory controller logic 211 for each of the memory nodes. Also, memory access requests in the memory network 100 are asynchronous and non-deterministic in that the time a response is received for a memory access request may not be predetermined, such as due to the routing of a memory access request in the memory network. This is different than conventional memory systems where the controller typically expects a response to a memory access command in a certain number of cycles.

In the decoupled memory interface design employed by the hierarchical memory subsystems, the main memory controllers of the processors and the co-memory controllers of the memory nodes 130 use an abstracted protocol for communication. For example, the processor-side main memory controller (e.g., main memory controller 111a or 111b) is responsible for sending the high-level memory access commands such as read, write, and block copy, from the processor to the memory network 100 where it is routed to the destination memory node. The read, write, and block copy commands are much simpler than the conventional RAS/CAS (row/column-based) memory commands in that the processor-side main memory controller does not have to know the intimate details of the memory device architecture, nor control memory timings through detailed memory command sequences such as activation, precharge, etc.

The memory-side memory controllers (e.g., memory controller logic 210 of a memory node) decode packets to extract the memory access commands and enforce memory management mechanisms that may be implemented and the actual execution of the read, write, and block copy commands from local memory. For example, after receiving a read command from a main memory controller of a processor, the co-memory controller at the destination memory node fetches the data from local memory and notifies the main memory controller that the data is ready to get or directly sends a data packet with transaction ID and the requested data back to the source main memory controller. These mechanisms depend on the specific type of the memory technology employed in the node; for example, the co-memory controller for DRAM is different from the controller for a DRAM stack, for Flash memory, or for other forms of non-volatile memory.

Both the processor-side main memory controllers and the memory node co-memory controllers are allowed to co-schedule memory requests to improve overall system performance. For example, the processor-side main memory controllers can tag memory requests with priority information to denote memory requests that must be returned as soon as possible or can be delayed without causing system performance degradation. The memory node co-memory controllers can reschedule the memory request according to the local memory device status (e.g., open row or close row status). When rescheduling, co-memory controllers may limit rescheduling requests to requests within the same priority level to ensure memory requests with higher priorities are processed first regardless of the local memory device status.

The decoupled memory interface design significantly reduces the complexity of the processor-side memory controller for managing channels, ranks, and banks, and enables the large-scale memory network with high parallelism. Also, in the decoupled memory interface design, the memory controllers at the memory nodes can manage local memory autonomously, hide the media level details, and provide a highly abstract interface. For example, the memory node memory controllers can perform a refresh of DRAM locally without the involvement of the main memory controllers. Therefore, the decoupled memory interface can support heterogeneous memory technologies including non-volatile memory (NVM) and DRAM, and the co-memory controller in each memory node is in charge of the timing and signaling interface of the specific memory technology. Thus, the memory network 100 isolates media-specific control operations to the per memory module-memory controller which reduces complexity while increasing performance in terms of latency and bandwidth.

In addition, the link bandwidth can be adjusted by negotiation between the main memory controllers and the memory node co-memory controllers according to the bandwidth requirement of each memory technology, and dynamically provisioned link bandwidth (e.g. allocate different number of lane for different links) to best leverage the memory bandwidth resource can be implemented.

Figure 5:
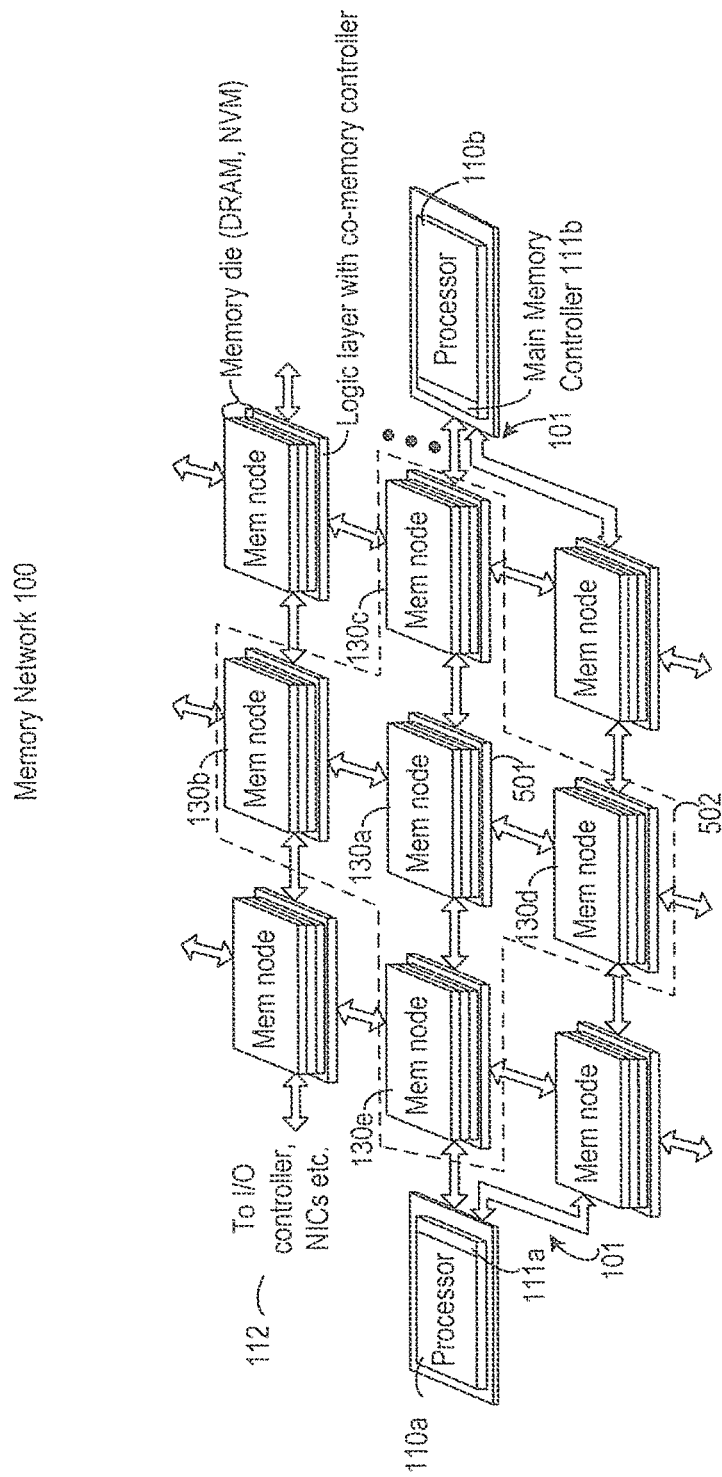
FIG. 5 illustrates an access group and a resiliency group for a memory node.

FIG. 5 shows an example of an access group 501 and a resiliency group 502 for a memory node 130a in the memory network 100. A single memory node or multiple memory nodes including memory accessed for a memory access operation are in the access group. The memory access operation may be performed in response to a memory access request from a processor, such as the processor 110a. The memory access operation may include a single read operation that can encompass memory in one or more memory nodes, depending on where the addresses of the requested data are located. In the example of FIG. 5, the access group 501 is a single memory node 130a.

The resiliency group 502 in this example includes memory nodes 130a-e. The memory nodes 130a-e are neighbor nodes in the 2D mesh topology shown in FIG. 2. As discussed above, different factors may be used to select a resiliency group, such as factors for considering tradeoffs between protection and performance. Any memory nodes connected by communication links 131 in the memory network 100 may be in a resiliency group. A resiliency group may or may not overlap with an access group. The co-memory controllers can communicate with each other by multicasting or broadcasting control messages to setup resiliency groups. Once a resiliency group is formed, each co-memory controller records its peers in the same group, and each group has data nodes and checksum nodes.

One advantage of the memory network 100 is that the error detection and error correction can be decoupled, which forms a hierarchical resilient system. Since multiple memory nodes can flexibly form a resiliency group, the memory protection can be decoupled into two separate steps with local error detection performed at the access group (e.g., a single memory node) and global error correction performed at the resiliency group, which may include more memory nodes than the access group, and may include redundant nodes. Since the native error-free execution enabled by local error detection at the access group is very efficient, the overall performance can be significantly improved compared to current resiliency methods used in memory systems. Moreover, since a co-memory controller is attached to each memory node in the memory network 100, the resiliency group formation, local error detection, and global correction can be offloaded to the co-memory controllers. In one example, CRC (cyclic redundancy check) can be used to protect the communication links, and main memory controllers at the processor side can use CRC to detect and correct errors in the high-speed links and not have to engage in the error detection and error correction offloaded to the co-memory controllers. Offloading these tasks from processors to co-memory controller further improves the overall system performance.

After memory errors are detected for memory accesses on the access group 501, the memory nodes 130a-e in the resiliency group 502 are used for an error correction operation for a memory access performed in the memory node 130a. The error correction operation includes correcting data corruption errors, which may include single bit errors such as when bits flip to a wrong state. An indication of an error may be sent to a main memory controller of the processor 110a if the error cannot be corrected locally.

For the error correction operation, different coding mechanisms can be used for the checksum nodes, from simple parity as in redundant array of independent disks (RAID) to more flexible symbol based Reed-Solomon code that allows an arbitrary number of data symbols and check symbols. In Reed-Solomon code, T check symbols can detect T symbol errors, for a max of $2^b-1$ symbols including both data and check symbols, where b is bit count per symbol.

According to an example, a read operation on the access group 501 containing memory node 130a is sent by the main memory controller 111a of the processor 110a to the memory node 130a. Memory controller logic for the access group 501 containing memory node 130a performs local error detection.

If no error is detected, the memory controller logic for the access group 501 containing memory node 130a sends the fetched data for the read operation to the main memory controller 111a. If an error is detected, the access group 501 containing memory node 130a initiates error correction in the resiliency group 502 containing the memory nodes 130a-e to recover the error by decoding the symbols from both data nodes and checksum nodes in the resiliency group 502. For example, a check can be achieved by performing a logical XOR operation across all symbols for example if a RAID-5-type organization is used. For each write access, the co-memory controller first encodes the new check symbols using the incoming data, and then updates the other check symbols in the checksum nodes of the resiliency group 502. For example, if RAID-5-type organization is used, the co-memory controller at the destination memory node reads the old data, generates the result of old_data XOR new_data, sends the results to its parity node, and updates the memory location. Once received, the co-memory controller at the parity node reads the old parity, generates the new parity (by XOR-ing it with the incoming result), and updates the parity. By offloading the negotiation and memory protection operations to the co-memory controller instead of performing them at the main memory controller of the processor, these operations are transparent to the processors and have minimal performance impact. RAID-5 is used as an example in the above explanation, and this approach can work with any other form of redundant organizations (e.g. other RAID levels) as well as with stronger and more flexible coding schemes such as Reed-Solomon code.

A sequence of multiple memory operations may be performed to recover data. For example, the main memory controller 111a issued one read command, while the memory node 130a may have issued multiple read (or other) commands to other memory nodes 130b-e to fully satisfy the read command of the main memory controller 111a. Thus, the host command may be decomposed into multiple and different native memory commands, while preserving the reliability of the native host command. Other commands may be decomposed as well. A copy command may be decomposed into a group of reads and writes. Other commands can decompose into groups of native memory read/write commands and the co-memory controller understand this, either by masking the fault or notifying the host with precise details. The co-memory controller (e.g., the memory control logic 211) can have a redundant partner and share the state about the execution of the group of commands, which may include the commands and progression of execution of the commands.

While the global error correction at the resiliency group level is very powerful, it may incur high overhead on performance and energy efficiency since more memory nodes than that in the access group are involved. Thus, the access group can solely rely on the resiliency group to correct all errors, which makes normal memory access very efficient but costly for error correction even for simple errors. On the other hand an access group can also correct memory errors which cause extra overhead for each memory access but can reduce overhead at the resiliency group level (global level). Examples of three kinds of memory protection that can achieve balanced overall system performance and energy efficiency on different scenarios are now described.

In one example, error detection is performed by the memory node(s) in the access group performing the memory access but no error correction is performed at the access group level. The resiliency group is responsible for error corrections on both local errors (e.g. errors of memory array, TSV, IO) and global errors (memory node(s) failure). The local error detection can be implemented by the control logic, such as the memory control logic 211 of the control logic 210 shown in FIG. 2, by using CRC for memory words at each memory access (read/write). Error correction may also be performed by the main memory controller of the processor. The memory node can detect and report failures due to various error mechanisms, such as memory arrays, TSVs, peripheral circuits, etc. This example dramatically simplifies the local resiliency design within the access group which may be one memory node, and saves a lot of storage overhead and hardware complexity for implementing error correction code. However, all the memory nodes in the resiliency group may be visited for recovery of each memory error, which can increase latency, bandwidth demands, and power consumption.

According to another example, error detection and error correction may be implemented at the memory nodes in an access group. In this example, symbol-based Reed-Solomon (RS) code with symbol placement requirements is used in each memory node, while each memory bank or subarray in a memory node is used to create an RS symbol. The control logic, such as memory controller logic, of the memory node, is able to both detect and correct the local errors in a node (e.g. memory array errors, TSV errors, etc.) using the RS symbols.

Figure 6:
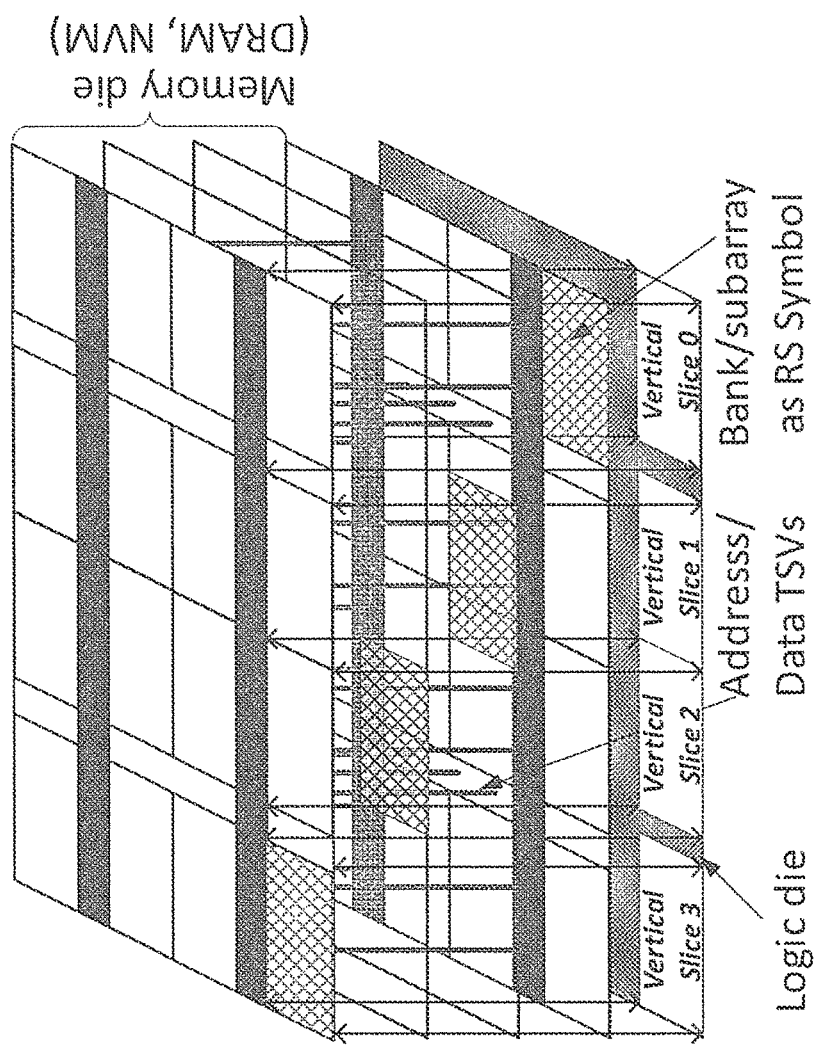
FIG. 6 illustrates that a different Reed-Solomon symbol may be used for each vertical slice and each plain in stacked memory.

FIG. 6 shows an example of error detection and error correction for a 3D memory stack. As shown in FIG. 6, each RS symbol is independent to avoid multiple errors caused by the same common failures (e.g. TSV failures will corrupt all symbols that use the TSVs as the data path to the logic die where the ECC logic resides). When this happens, the errors are usually beyond correction by the ECC technique. To prevent multiple error detections caused by the same common failure, the RS symbols come from different die in the stacked memory and from different vertical slices in the stacked memory as shown in FIG. 6.

This design achieves high resiliency within each memory node, and has certain flexibility in allocating numbers of data nodes and check nodes to balance storage overhead and resiliency. It also relaxes the pressure on global protection and therefore improves inter-node performance and efficiency. However, it's at the cost of reducing the local memory node performance and efficiency, because each memory access includes the co-operation of multiple memory dies and vertical slices.

In another example, when errors are detected, the memory node, via its control logic, first diagnoses the error causes by issuing local test patterns. Once the error sources are identified, the memory node does error correction, which may include mapping of failed components with redundant components, or resorting to its resiliency group for error recovery if the errors are beyond the scope of local error correction.

In this example, the common errors (e.g. TSV, peripheral circuit errors) can be identified separately from independent errors (e.g. memory cell errors). Both CRC and RS code are used locally in a memory node. On detection of a burst error by CRC, the control logic, such as the memory controller logic with built-in self-test (MT), runs dynamic self-diagnose with different test patterns. In this way, the error source can be identified. If it is a common error, the memory controller logic can identify the failed component and use the build-in redundant resources (extra memory array, TSV etc.) to repair and replace it. If it is not a common error and it's an individual error, then the RS code is used to correct the symbol error directly.

In this example, the memory controller logic may repair the common errors if there are redundant components. When the repair of common errors cannot be done or the error sources cannot be identified through self-diagnosis, the memory controller logic reports the error to the resiliency group. The global resiliency group is used to recover the corrupted data in the memory node.

One advantage in this example is that the system can eliminate the restriction of placing symbols on different die and vertical slices if 3D stacked memory is used in the memory node. Thus, the symbols in the same RS code group can be selected from the same die or vertical slice, and the internal parallelism is well maintained in the stack.

The memory network 100 also provides other resiliency enhancements. For most topologies (e.g., mesh, torus, etc.), the memory network 100 has multiple alternative paths for a single destination memory node. Thus, a single link or a memory node failure does not affect the availability of the memory system. Also, the links 101 and 131 may each have multiple lanes. If a lane or a few lanes fail, the routing logic at each memory node can perform lane failover by disabling the failed lanes and running the link at reduced bandwidth. CRC may be performed to detect link or lane failures. If a link or lane fails, the CRC continuously report errors to the main memory controller. After a certain preset threshold, the main memory controller records the link failure and disables the specific failed link or lane. The adjacent links or lanes are used for routing memory operations. With these alternative paths, no single point of failure can take down the memory system.

Figure 7:
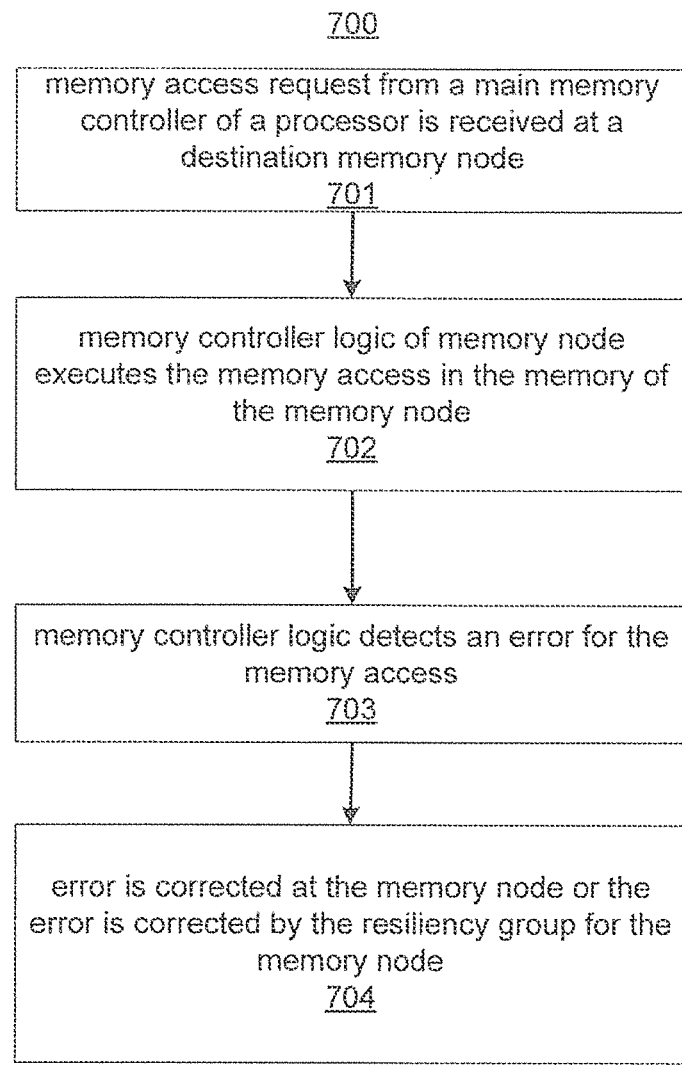
FIG. 7 illustrates a flow chart for error detection and correction.

FIG. 7 illustrates a method 700 for error detection and/or correction in the memory network 100 according to an example. At 701, a memory access request from a main memory controller of a processor is received at a destination memory node. For example, the memory node 130a shown in FIG. 5 receives a memory request routed to it via the memory network 100. At 702, the memory controller logic of the memory node 130a executes the memory access in the memory of the memory node. At 703, the memory controller logic detects an error for the memory access. For example, CRC parity bits are used to detect a bit error. At 704, the error is corrected at the memory node or the error is corrected by the resiliency group for the memory node. If the error cannot be corrected, the system may crash or the data may need special handling.

While the embodiments have been described with reference to examples, various modifications to the described embodiments may be made without departing from the scope of the claimed features.

What is claimed is:

1. A memory network comprising:
   memory nodes, wherein each memory node includes a memory and a memory controller logic;
   inter-node links connecting the memory nodes with each other, wherein the memory controller logic of a memory node in the memory network is to receive a memory access request from a main memory controller of a processor connected to the memory network and detect an error in data for the memory access, and a resiliency group for the memory node to provide error correction for the detected error, the resiliency group including at least one memory node in the memory network, wherein the memory network employs a tree structure and the resiliency group includes memory nodes in a parent-child relationship with the memory node receiving the memory access request.

2. The memory network of claim 1, wherein the resiliency group comprises a plurality of the memory nodes, including the memory node executing the memory access and another memory node connected to the memory node by one of the plurality of inter-node links.

3. The memory network of claim 2, wherein the plurality of memory nodes in the resiliency group are neighbors to the memory node for the memory access.

4. The memory network of claim 1, wherein an access group including a memory node for the memory access is to detect the error, and the resiliency group to correct the error includes multiple memory nodes.

5. The memory network of claim 1, wherein the memory controller logic of the memory node executing the memory access is to:
determine a source of the error;
determine whether the memory controller logic of the memory node executing the memory access is able to correct the error; and
correct the error in response to determining that the memory controller logic is able to correct the error.

6. The memory network of claim 5, wherein the memory controller logic of the memory node executing the memory access is to:
determine whether the resiliency group is able to correct the error in response to determining that the memory controller logic of the memory node is unable to correct the error; and
communicate with the resiliency group to correct the error in response to determining that the resiliency group is able to correct the error.

7. The memory network of claim 1, wherein a number of memory nodes in the resiliency group is determined based on performance, resiliency, and storage overhead.

8. The memory network of claim 1, wherein the memory controller logic in the memory node decomposes the memory access request into a group of read or write commands to be executed by the resiliency group.

9. The memory network of claim 8, wherein the memory node has a redundant memory node in the network and the memory node and the redundant memory node share a state of the execution of the group of read or write commands.

10. The memory network of claim 1, wherein a memory node in the memory network is to determine whether a lane in one of the inter-node links or an entire inter-node link failed, and to utilize another lane in the inter-node link or a different inter-node link in response to detecting the failure.

11. A memory node comprising:
a stacked memory including a plurality of memory layers;
a base logic layer including memory controller logic to perform memory accesses on the stacked memory, wherein the memory controller logic decomposes a memory access request into a group of read or write commands to be executed by a resiliency group for the memory node, the resiliency group to provide error correction for a detected error; and
vias connected to the plurality of layers to the base logic layer, wherein the base logic layer is to determine Reed-Solomon (RS) symbols for each memory bank or subarray in a different layer and a different vertical slice of the stacked memory, and each RS symbol provides error correction for the memory bank or subarray.

12. The memory mode of claim 11, wherein the memory controller logic is to detect an error for a memory access in the stacked memory, and to correct the error using at least one of the RS symbols.

13. A method comprising:
determining a resiliency group of a memory node based on performance, resiliency, and storage overhead;
receiving a memory access request from a main memory controller of a processor at the memory node, wherein the memory node includes memory controller logic and memory;
executing the memory access in the memory by the memory controller of the memory node;
detecting an error of the memory access by the memory controller logic; and
correcting the error by the memory controller logic or correcting the error by the resiliency group of the memory node.

14. The method of claim 13, further comprising correcting the error by the resiliency group in response to the memory controller logic being unable to correct the error without the resiliency group.

15. The memory node of claim 12, wherein the memory node has a redundant memory node in the network and the memory node and the redundant memory node share a state of the execution of the group of read or write commands.

* * * * *